(12) United States Patent
Wang

(10) Patent No.: US 10,142,620 B2
(45) Date of Patent: Nov. 27, 2018

(54) METHODS FOR OPTIMIZING RETRO-REFLECTIVE DISPLAY SYSTEMS

(71) Applicant: MIRRAVIZ, INC., Fremont, CA (US)

(72) Inventor: Michael W. Wang, Sunnyvale, CA (US)

(73) Assignee: MIRRAVIZ, INC., Fremont, CA (US)

( * ) Notice: Subject to any disclaimer, the term of this patent is extended or adjusted under 35 U.S.C. 154(b) by 0 days.

(21) Appl. No.: 15/495,869

(22) Filed: Apr. 24, 2017

(65) Prior Publication Data

US 2017/0251203 A1    Aug. 31, 2017

Related U.S. Application Data

(63) Continuation of application No. PCT/US2015/057625, filed on Oct. 27, 2015.

(60) Provisional application No. 62/122,662, filed on Oct. 27, 2014.

(51) Int. Cl.
| | |
|---|---|
| H04N 13/351 | (2018.01) |
| H04N 13/04 | (2006.01) |
| G03B 21/60 | (2014.01) |
| G02B 5/124 | (2006.01) |
| G03B 35/22 | (2006.01) |
| H04N 13/302 | (2018.01) |
| H04N 13/363 | (2018.01) |

(52) U.S. Cl.
CPC .......... *H04N 13/351* (2018.05); *G02B 5/124* (2013.01); *G03B 21/60* (2013.01); *G03B 35/22* (2013.01); *H04N 13/0402* (2013.01); *H04N 13/0447* (2013.01); *H04N 13/0459* (2013.01); *H04N 13/302* (2018.05); *H04N 13/363* (2018.05)

(58) Field of Classification Search
CPC .................................................. H04N 13/0447
USPC .................................................. 359/459, 529
See application file for complete search history.

(56) References Cited

U.S. PATENT DOCUMENTS

| | | | |
|---|---|---|---|
| 3,817,596 A | 6/1974 | Tanaka | |
| 4,775,219 A | 10/1988 | Appeldorn et al. | |
| 5,763,049 A | 6/1998 | Frey et al. | |

(Continued)

FOREIGN PATENT DOCUMENTS

| | | |
|---|---|---|
| WO | WO-2013188690 A2 | 12/2013 |
| WO | WO-2015187433 A1 | 12/2015 |

OTHER PUBLICATIONS

International Search Report dated Jan. 27, 2016 for International Application No. PCT/US2015/057625.

(Continued)

*Primary Examiner* — Christopher Mahoney
(74) *Attorney, Agent, or Firm* — Wilson Sonsini Goodrich & Rosati

(57) ABSTRACT

Systems and methods provide a retro-reflective screen covered with a screen material. The retro-reflective screen has a plurality of retro-reflective screen elements positioned within the screen material. At least one of the plurality of retro-reflective screen elements is oriented so as to have an incident angle that is less than 45 degrees. Additionally, a portion of the screen material that corresponds to the at least one screen element has an incident angle that is greater than the incident angle of the at least one screen element. Additionally, the system also comprises at least one projector that (i) generates light characterizing an image or video and (ii) projects the light onto the retro-reflective screen.

25 Claims, 20 Drawing Sheets

(56) References Cited

U.S. PATENT DOCUMENTS

| | | |
|---|---|---|
| 7,261,424 B2 | 8/2007 | Smith |
| 7,370,981 B2 | 5/2008 | Couzin |
| 7,561,330 B2 * | 7/2009 | Goto ................ G03B 21/10 353/79 |
| 2011/0216411 A1 | 9/2011 | Reed et al. |
| 2012/0099199 A1 | 4/2012 | Vasylyev |
| 2013/0300637 A1 | 11/2013 | Smits et al. |
| 2013/0342413 A1 | 12/2013 | Choi et al. |
| 2013/0342813 A1 | 12/2013 | Wang |

OTHER PUBLICATIONS

Yoder, P.R., Study of Light Deviation Errors in Triple Mirrors and Tetrahedral Prisms, J. Opt. Soc. Am. 48, 496-499 (1958).

* cited by examiner

METHODS FOR OPTIMIZING RETRO-REFLECTIVE DISPLAY SYSTEMS

CROSS-REFERENCE

This application is a continuation of International Application Serial No. PCT/US2015/057625, filed Oct. 27, 2015, which claims priority to U.S. Provisional Patent Application Ser. No. 62/122,662, filed Oct. 27, 2014, each of which is entirely incorporated herein by reference.

BACKGROUND

Current state-of-the-art display systems generally consist of either flat-panel displays or projector-based displays. The flat-panel displays are generally based on liquid crystal display (LCD) pixels with light emitting diode (LED) backlighting or plasma-based screens. In some cases it is difficult to attain screen sizes significantly larger than 80 inches in the diagonal dimension due to various considerations. For flat-panel displays, nonlinear increases in cost as the screen size grows, as well as high power consumption, may limit screen sizes to below 80 inches at typical consumer price points. For projection-based displays, decreasing screen brightness and increasing power consumption, projector size and projector noise, may be significant limitations if the screen size is increased above 80 inches. Additionally, for both types of displays there is currently no optimal solution for glasses-free three-dimensional (3D) immersive viewing. Current 3D display systems rely on either active or passive glasses, or require the viewer to be located in a substantially constrained region of space in line-of-sight of the display.

SUMMARY

Recognized herein is the need for display systems that are improved in relation to systems currently available. In particular, recognized herein is the need for a system that permits multiple viewers to view individual customized video streams simultaneously on the same screen as well as a glasses free 3-D immersive viewing capability. This type of capability may enable an immersive multiplayer gaming experience that does not currently exist with display systems currently available. This type of system may also enable customize large area displays for advertising or other applications where it can be beneficial for multiple users to observe unique streams of media. Additionally, screens or other retro-reflective surfaces within the system may benefit from orienting the retro-reflective elements such that the incident angle for the individual elements is small (e.g., 45 degrees or less) even when the incident angle to the macroscopic screen surface at that location is not small (e.g., more than 45 degrees).

Some embodiments of approaches to enable this type of capability involve display systems utilizing a projector and a retro-reflective screen. In examples, some display systems may comprise a projector combined with a retro-reflective screen and a viewer distance from the projector such that the observation angle is small. In some cases, the observation angle may be less than approximately 10 degrees, 5 degrees, 4 degrees, 3 degrees, 2 degrees, or 1 degree. The observation angle is defined as the angle between the line from the projector to any given location on the screen and the line from that same location on the screen to the eye(s) of the viewer. The incident angle is typically defined as the angle between the projector and the normal angle with respect to the screen surface. In some cases, the incident angle to the screen surface may be different from the incident angle to individual elements within the screen.

In some cases, depending on the location and orientation of the projector, viewer, and retro-reflective material/screen, the incident angle to the individual retro-reflective elements may be larger than desired, which can result in degradation of retro-reflected image intensity and uniformity. This situation can occur near the edges of a retro-reflective screen in systems where the user and project are closer in proximity to the center of the screen. This situation can also occur in examples where portions of the display system are distributed across surfaces that are at offset angles to one another. For example, this situation can occur when screens of a display system are presented on and across intersecting wall areas. This situation can also occur when curved screens are utilized or when retro-reflective material is used on objects, implements such as for example, gaming accessories. The present disclosure provides systems and methods to enable improved uniformity and brightness for display systems utilizing a projector and retro-reflective material through optimization of individual elements of the retro-reflective screen. In particular, individual elements of the retro-reflective screen may be optimized based on location and/or orientation of the screen elements relative to the projector in order to minimize the distribution of incident angles under typical usage scenarios.

The present disclosure provides systems and methods to enable significant improvements in display systems utilizing a projector and a retro-reflective screen through optimization of location and/or orientation of the retro-reflective screen elements in order to customize the retro-reflected spatial profile. The nature of a retro-reflective display system can enable significantly improved image brightness in comparison to a standard projector/reflective screen system. However, depending on the specific location and/or orientation of the retro-reflective screen elements for a given dimension of space that is holding the retro-reflective display system, further optimization of the incident angles can significantly improve both the intensity of light reaching a viewer's eyes as well as improvement in the ability to optimize a ratio of light intensity reaching each eye for glasses-free 3D applications. In particular, retro-reflective elements of the retro-reflective screen may be optimized such that the incident angle to the corner cube reflective element has a distribution centered upon a line normal to the nominal front surface of each corner cube or truncated corner cube. In this manner, the brightness and uniformity of projected images can be improved.

In one aspect of the invention, a display system is provided. The display system comprises a retro-reflective screen covered with a screen material. The retro-reflective screen has a plurality of retro-reflective screen elements positioned within the screen material. At least one of the plurality of retro-reflective screen elements is oriented so as to have an incident angle that is less than 45 degrees. Additionally, a portion of the screen material that corresponds to the at least one screen element has an incident angle that is greater than the incident angle of the at least one screen element. Additionally, the system comprises at least one projector that (i) generates light characterizing an image or video and (ii) projects the light onto the retro-reflective screen.

In some embodiments, the at least one screen element has an incident angle selected from the group consisting of 0 degrees, 15 degrees, 30 degrees, 45 degrees, 60 degrees, and 75 degrees, and additionally, the portion of the screen material that corresponds to the at least one screen element has an incident angle of 90 degrees. In some embodiments, the at least one screen element has an incident angle selected from the group consisting of 0 degrees, 15 degrees, 30 degrees, 45 degrees, and 60 degrees, and additionally, the portion of the screen material that corresponds to the at least one screen element has an incident angle of 75 degrees. In some embodiments, the at least one screen element has an incident angle selected from the group consisting of 0 degrees, 15 degrees, 30 degrees, 45 degrees, and 55 degrees, and additionally, the portion of the screen material that corresponds to the at least one screen element has an incident angle of 60 degrees. In some embodiments, the at least one screen element has an incident angle selected from the group consisting of 0 degrees, 15 degrees, 30 degrees, and 40 degrees, and additionally, the portion of the screen material that corresponds to the at least one screen element has an incident angle of 45 degrees. In some embodiments, the at least one screen element has an incident angle selected from the group consisting of 0 degrees, 5 degrees, 10 degrees, 15 degrees, and 20 degrees, and additionally, the portion of the screen material that corresponds to the at least one screen element has an incident angle of 30 degrees.

In some embodiments, the projector projects the light onto the retro-reflective screen without passage through a beam splitter. In some embodiments, the retro-reflective screen reflects the light from the projector to a viewer without the passage of light through a beam splitter. In some embodiments, the retro-reflective screen reflects the light from the projector to a viewer at an observation angle that is less than about 3°. In some embodiments, the projector is mountable on a body of a viewer. In some embodiments, the projector is mountable on a head of a viewer. In some embodiments, the retro-reflective screen comprises truncated corner cube reflectors. In some embodiments, the display system further comprises a sound system for providing sound to complement the image or video. In some embodiments, the image or video is three-dimensional. In some embodiments, a portion of the plurality of retro-reflective screen elements are oriented incrementally to optimize for a certain position of a projector relative to the screen.

In some embodiments, a portion of the plurality of retro-reflective screen elements are oriented incrementally to optimize for a certain position of a user relative to the screen. In some embodiments, screen elements having an incident angle above a certain threshold are re-oriented. In some embodiments, screen elements that do not have an incident angle above a certain threshold are not re-oriented. In some embodiments, a portion of the plurality of retro-reflective screen elements are oriented towards a certain position of a user and/or projector relative to the screen. In some embodiments, a portion of the plurality of retro-reflective screen elements are oriented towards an expected position of the user and/or projector relative to the screen. In some embodiments, a portion of the plurality of retro-reflective screen elements are oriented towards a position nearby an expected position of the user and/or projector relative to the screen. In some embodiments, at least a portion of the screen elements are oriented in clusters such as the schematic shown in FIG. 12. In some embodiments, at least a portion of the screen elements is oriented in continuous manner such as the schematic shown in FIG. 20. In some embodiments, at least a portion of the plurality of screen elements is provided on an implement or gaming accessory or other screen-related object oriented so as to optimize incident angles of the plurality of screen elements.

In another aspect of the invention, a method for projecting an image or video for view by a viewer is provided. The method comprises providing a retro-reflective screen covered with a screen material, the retro-reflective screen having a plurality of retro-reflective screen elements positioned within the screen material, wherein at least one of the plurality of retro-reflective screen elements is oriented so as to have an incident angle that is less than 45 degrees, and wherein a portion of the screen material that corresponds to the screen element has an incident angle that is greater than the incident angle of the screen element. Additionally, the method comprises directing light characterizing an image or video from a projector to the retro-reflective screen, wherein the retro-reflective screen having the retro-reflective screen elements reflects the light at an angle that has a distribution centered upon a normal incident angle.

In some embodiments, the retro-reflective screen reflects the light from the projector to the viewer without use of a beam splitter. In some embodiments, the projector is mounted on the body of the viewer. In some embodiments, the projector is mounted on a head of the viewer. In some embodiments, the method further comprises providing the viewer with sound to complement the image or video. In some embodiments, the image or video is three-dimensional.

In a further aspect of the invention, a method for projecting an image or video is provided. The method comprises directing light characterizing an image or video from a projector to a retro-reflective screen in optical communication with the projector. The retro-reflective screen has screen elements that are oriented so as to have an incident angle that is less than 45 degrees. Additionally, a portion of the screen material that corresponds to the screen element has an incident angle that is greater than the incident angle of the screen element, and wherein upon the directing, the light is reflected at a higher incident angle from the screen material than the light is reflected from the surface of a portion of the plurality of screen elements.

In some embodiments, the light is viewable by a plurality of viewers. In some embodiments, each of the plurality of viewers is at different locations with respect to the retro-reflective screen.

In another aspect of the invention, a method for projecting an image or video for view by a viewer is provided. The method comprises using a projector to generate light characterizing an image or video. Additionally, the method comprises directing the light from the projector to a retro-reflective screen in optical communication with the projector, wherein the retro-reflective screen has retro-reflective screen elements that reflect the light, such that the light reflected by the retro-reflective screen is covered with a screen material, the retro-reflective screen having a plurality of retro-reflective screen elements positioned beneath the screen material, wherein at least one of the plurality of retro-reflective screen elements is oriented so as to have an incident angle that is less than 45 degrees, and wherein a portion of the screen material that corresponds to the screen element has an incident angle that is greater than the incident angle of the screen element.

In some embodiments, the retro-reflective screen reflects the light from the projector to the viewer without use of a beam splitter. In some embodiments, the projector is mounted on the body of the viewer.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, ended several details are capable of modifications in various obvious respects, all without departing from the disclosure. Accordingly the drawings and description are to be regarded as illustrator for nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity. A better understanding of the features and advantages of the present invention will be obtained by reference to the following detailed description that sets forth illustrative embodiments, in which the principles of the invention are utilized, and the accompanying drawings (also "FIG." herein), of which.

DETAILED DESCRIPTION

Figure 1:
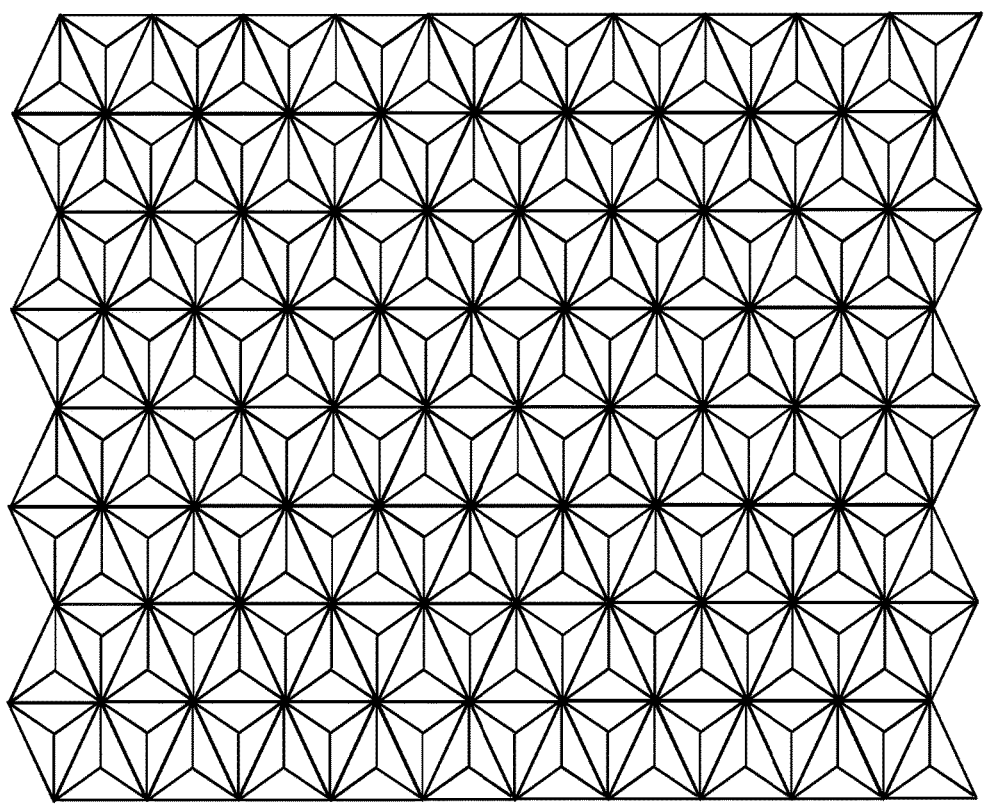
FIG. 1 schematically shows a magnified front view of a representative retro-reflective screen, in accordance with embodiments of the invention.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein can be employed in practicing the invention.

The term "retro-reflective" (also "retro-reflective" or "retro-reflective" herein), as used herein, generally refers to a device or surface that reflects light back to its source with a minimum scattering of light. In a retro-reflective screen, an electromagnetic wave is reflected back along a vector that is parallel to but opposite in direction from the source of the wave. A retro-reflective screen comprises a retro-reflective surface comprised of many small individual corner cube reflective elements.

The term "corner cube reflective element", as used herein, generally refers to a reflective partial cube composed of three mutually perpendicular or nearly perpendicular, flat reflective surfaces. With this geometry, incident light is reflected back directly towards the source.

The term "projector," as used herein, generally refers to a system or device that is configured to project (or direct) light. The projected light can project an image and/or video.

The term "observation angle," as used herein, generally refers to an angle between a first line directed from a projector to a given location on a screen and a second line from that same location on the screen to one or more eyes of a viewer.

The term "incidence angle," as used herein, generally refers to an angle between a first line directed from a projector to a given location on a screen and a second line that is normal to the nominal front surface that is receiving the light. Accordingly, when an incident angle is being assessed in the context of a screen as a whole, the incident angle of the screen refers to the angel between the first line directed from a projector to the material of the screen and the second line that is normal to the material of the screen. In other examples, when an incident angle is being assessed in context of the front surface of a screen element, such as a corner cube that is positioned as part of the screen materials, the incident angle of the screen element refers to the angle between the first line directed from a projector to the screen element and the second line that is normal to the nominal front surface of the screen element. In examples, the screen element may be a corner cube. Additionally, the nominal front surface of the corner cube is defined as a surface perpendicular to and intersecting a line from the corner of the corner cube structure to the hypothetical opposite corner of the cube if the corner cube were to have been a full cube. In typical retroreflective corner cube screens not incorporating this invention, the nominal front surface of each corner cube element is approximately parallel to the front surface of the screen material.

The present disclosure provides a display system that permits multiple viewers to view individual customized video streams simultaneously on the same screen as well as a glasses free 3D immersive viewing capability. The display system can comprise a projector combined with a retro-reflective screen and a viewer distance from the projector. The brightness of the image on the screen of the display system can be increased by a factor of about 100 to 500 as compared to traditional display systems with an equivalent power or intensity of light source.

Some embodiments of the invention provide for engineering and customizing the retro-reflective elements of the retro-reflective screen such that the incident angle to the corner cube reflective element have a distribution centered upon the normal incident angle. In this manner the brightness and uniformity of projected images can have improved uniformity.

Retro-Reflector Display Systems

The present disclosure provides a display system with a retro-reflective screen having retro-reflective screen elements that are engineered and customized such that brightness can be significantly improved above and beyond the already significant intensity increase enabled by baseline retro-reflective display systems. In particular, the present disclosure provides examples of a location dependent reflector display system, as discussed further below. In an example of a retro-reflective display system is seen in FIG. 1. In particular, FIG. 1 shows a front view of a representative retro-reflective screen, in accordance with an embodiment of the invention. The retro-reflective screen as seen in FIG. 1 is comprised of an array of truncated corner cube reflectors. The corner cube reflectors may also be comprised of alternative geometries. Examples of corner cube reflectors are provided in U.S. Pat. No. 5,763,049 to Frey et al. and U.S. Pat. No. 7,261,424 to Smith, which patents are entirely incorporated herein by reference. In some embodiments, the size of each of the corner cube reflectors is smaller than the anticipated or predicted pixel size of the projected image, with the pixel size determined by the combination of the projector display system and the distance of the projector from the retro-reflective screen.

The display system can be used with any retro-reflective display application where the observation angle is non-zero. Additionally, the display system can be used with any retro-reflective display application where the angle is zero. The retro-reflective screen, which can be configured to reflect incident light along a direction that is substantially opposite to the direction of propagation of the incident light, can enable significantly improved brightness. The incident light can be reflected along a direction that is opposite from the direction of propagation, such as antiparallel or reflected along a direction that is generally opposite from the direction of propagation, but not exactly parallel, or non-parallel. For example, the incident light is reflected along a direction that is from about 170°-190° with respect to the direction of propagation.

The display system can comprise a retro-reflective screen configured to reflect incident light along a direction that is substantially non-parallel (e.g., anti-parallel to the direction of propagation of the incident light, and a projector for projecting light characterizing an image or video onto the retro-reflective screen without the passage of light through a beam splitter. The retro-reflective screen may reflect incident light from the projector to a viewer without the passage of light through either a beam splitter or any diffuser layers. The retro-reflective screen can reflect incident light from the projector to a viewer at an observation angle that is less than or equal to about 20°, 15°, 10°, 9°, 8°, 7°, 6°, 5°, 4°, 3°, 2°, 1.5°, 1°, 0.5°, 0.4°, 0.3°, 0.2°, or 0.1°. The observation angle can be between about 0.1° and 10°, or 0.2° and 3°. The display system can operate without the need of a beam splitter, thereby advantageously providing for reduced complexity and/or cost as well as avoiding at least a 2×, 3×, 4× or greater reduction in intensity compared to a system using a beam splitter.

The observation angle can be a function of the distance of the user from the retro-reflective screen. In some embodiments, the observation angle is less than about 5°, 4°, 3°, 2°, 1.5°, 1°, 0.5°, 0.4°, 0.3°, 0.2°, or 0.1° when the user is at a distance of at least about 1 foot, 2 feet, 3 feet, 4 feet, 5 feet, 6 feet, 7 feet, 8 feet, 9 feet, or 10 feet from the retro-reflective screen. In an example, the observation angle can be less than about 3° when the user is at a distance of at least about 4 feet from the retro-reflective screen. In some cases, the intensity of reflected light from the retro-reflected screen is a maximum at observation angle of about 0°, and decreases with increasing observation angle.

In an aspect, a display system comprises a retro-reflective screen having retro-reflective screen elements that reflect light along a direction that is substantially non parallel to the direction of propagation of the light. Each of the retro-reflective screen elements comprises at least three intersecting planes (e.g., in the form of a pyramidal structure or truncated pyramidal structure). At least one of the three intersecting planes can intersect an adjacent plane (e.g., of the same retro-reflective screen element) at an angle that is 90° with an offset greater than 0°. The system further comprises at least one projector that projects the light onto the retro-reflective, which light characterizes an image or video. The retro-reflective screen having the retro-reflective screen elements may orient and/or locate the screen elements so as to optimize light reflected along an incident angle so as to have a distribution that is centered on a normal incident angle. The retro-reflective screen can include truncated corner cube reflectors. Additionally, in some cases, the system comprises multiple projectors. For example, the system can include two projectors that provide a stereoscopic image or video for 3D viewing.

The image or video can be three-dimensional. For example, the image or video is rendered by more than one projector such that, upon reflection by the retro-reflective screen, the image or video is three-dimensional. In some cases, the image or video is three-dimensional without the use of any optics, such as 3D glasses.

Each of at least one, two or all three of the three intersecting planes can intersect a plane of an adjacent retro-reflective screen element at an angle that is 90° with an offset greater than 0°. The offset can be at least about 0.01°, 0.05°, 0.1°, 0.15°, 0.2°, 0.3°, 0.4°, 0.5°, 1°, 2°, 3° 4°, 5° or 10°. In some cases, the offset is between about 0.01° and 5°, or 0.1° and 1°. In some examples, the offset is from about 0.1° to 1.5°; below 0.1 may not yield much change in profile, whereas above 1.5° may yield a loss intensity. The offset can be as described elsewhere herein.

The projector can project the light onto the retro-reflective screen without passage through a beam splitter. The retro-reflective screen can reflect the light from the projector to a viewer without the passage of light through a beam splitter. Thus, a beam splitter can be precluded from the display system.

The projector can be mountable on a body of a viewer. In some examples, the projector is mountable on a head of the viewer. The projector can be mountable with a support member, such as body or head support member (e.g., support strap(s)). The projector can also be mounted at a fixed location, independent of the viewer such that a viewer may enter the range of the projector.

The display system can include a sound system for providing sound to complement the image or video. The sound can go along with a viewer's viewing experience, such as by way of headphones or other local speaker system.

The retro-reflective system can have various sizes and configurations. The screen can be substantially flat or curved. The screen can have a width of at least about 1 meter (m), 10 m, or 50 m, and a height of at least about 1 m, 10 m or 50 m. In large area settings, a large area display can be effective for advertising purposes, or other showcase demonstrations, due, at least in part, to the qualities of the display size and having multiple images/videos on the same screen area.

In some examples, a first plane of the three intersecting plane intersects an adjacent plane of the retro-reflective screen element at an angle that is 90° with a first offset greater than 0° in either direction from the nominal 90% angle, and a second plane of the three intersecting plane intersects a plane of an adjacent retro-reflective screen element at an angle that is 90° with a second offset greater than 0°. The first offset can be different from the second offset. Alternatively, the first offset can be the same as the second offset. In some cases, a third plane of the three intersecting plane intersects a plane of an adjacent retro-reflective screen element at an angle that is 90° with a third offset greater than 0°. The third offset can be different from the first offset, second offset, or first and second offsets. Alternatively, the third offset can be the same as the first offset, second offset, or first and second offsets. Examples of these retro-reflective screen elements are discussed in PCT patent application Serial No. PCT/US2015/032757 as filed on May 25, 2015, which is incorporated herein by reference. In some situations, the methods described in PCT patent application Serial No. PCT/US2015/032757 may be enhanced by reducing incidence angles to individual retro-reflective elements as outlined in this application.

Figure 17:
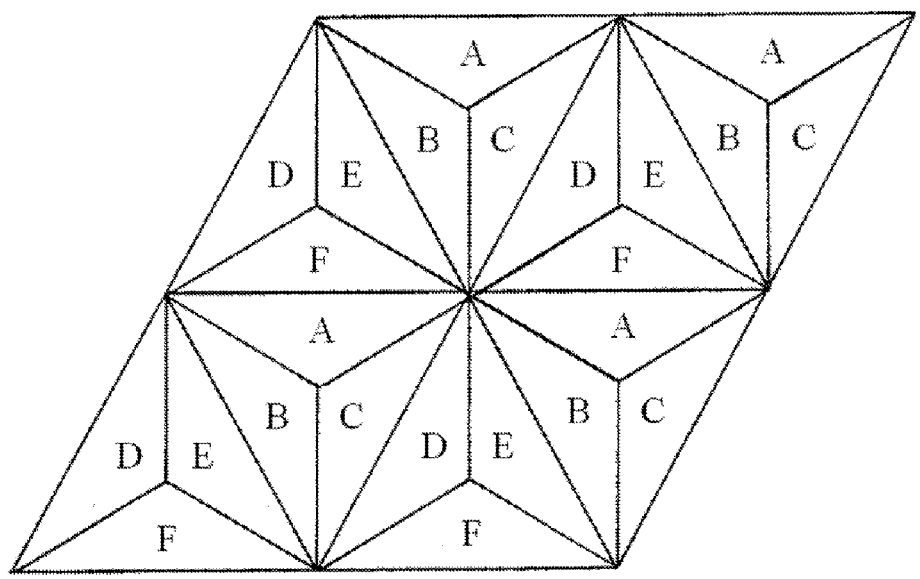
FIG. 17 schematically illustrates a retro-reflective screen with retro-reflective screen elements having intersecting planes, in accordance with embodiments of the invention.

A retro-reflective screen can include retro-reflective screen elements having intersecting planes, in accordance with embodiments of the invention. This is schematically illustrated in FIG. 17, which shows pyramidal retro-reflective screen elements with intersecting planes A-F. Planes of adjacent elements may intersect one another at an angle that is 90°. For example, Planes B and C at the bottom left-hand portion of the schematic intersect at an angle of 90°. In some cases, at least one of three intersecting planes can intersect an adjacent plane (e.g., of the same retro-reflective screen element) at an angle that is 90° with an offset greater than 0°. For example, the D plane at the bottom left-hand portion of FIG. 17 can intersect the E plane at an angle that is 90° with an offset greater than 0°.

Retro-reflective screen elements and angular distribution of light from the elements may be as described, for example, in U.S. Pat. Nos. 3,817,596, 4,775,219 and 7,370,981, and P. R. Yoder, "Study of Light Deviation Errors in Triple Mirrors and Tetrahedral Prisms," J. Optical Soc. Amer., vol. 48, No. 7, pp 496-499 (July 1958), each of which is entirely incorporated herein by reference.

There are various approaches for manufacturing retro-reflective screens with retro-reflective screen elements. Examples of such approaches are described in U.S. Pat. Nos. 5,763,049 and 7,261,424, each of which is entirely incorporated herein by reference.

Location Dependent Reflector Display System

Display systems based on a retro-reflective screen configured to reflect incident light along a direction that is substantially anti-parallel to the direction of propagation of the incident can enable significantly improved brightness. However, in a virtual full room environment with the retro-reflective screens extending into the corners of rooms as well as the intersection of floors and ceilings to wall, the incident angle of light onto the reflection screen can deviate significantly from a normal incident angle, thereby impacting display uniformity and brightness. An aspect of the invention provides for engineering and customizing the retro-reflective elements of the retro-reflective screen such that the incident angle to the corner cube reflective element have a distribution centered upon the normal incident angle. In this manner, the brightness and uniformity of projected images can be significantly improved. The invention has applicability to any locations where the incident angle has an expected distribution of angles that is different from the normal incident angle. For example, at and near the intersection of floors, walls, and ceilings there is a predicable incident angle distribution that is offset relative to a normal incident angle. As another example, implements or other objects with retro-reflective surfaces as part of a virtual environment may also have incident angle distributions offset from a normal incident angle.

Figure 2:
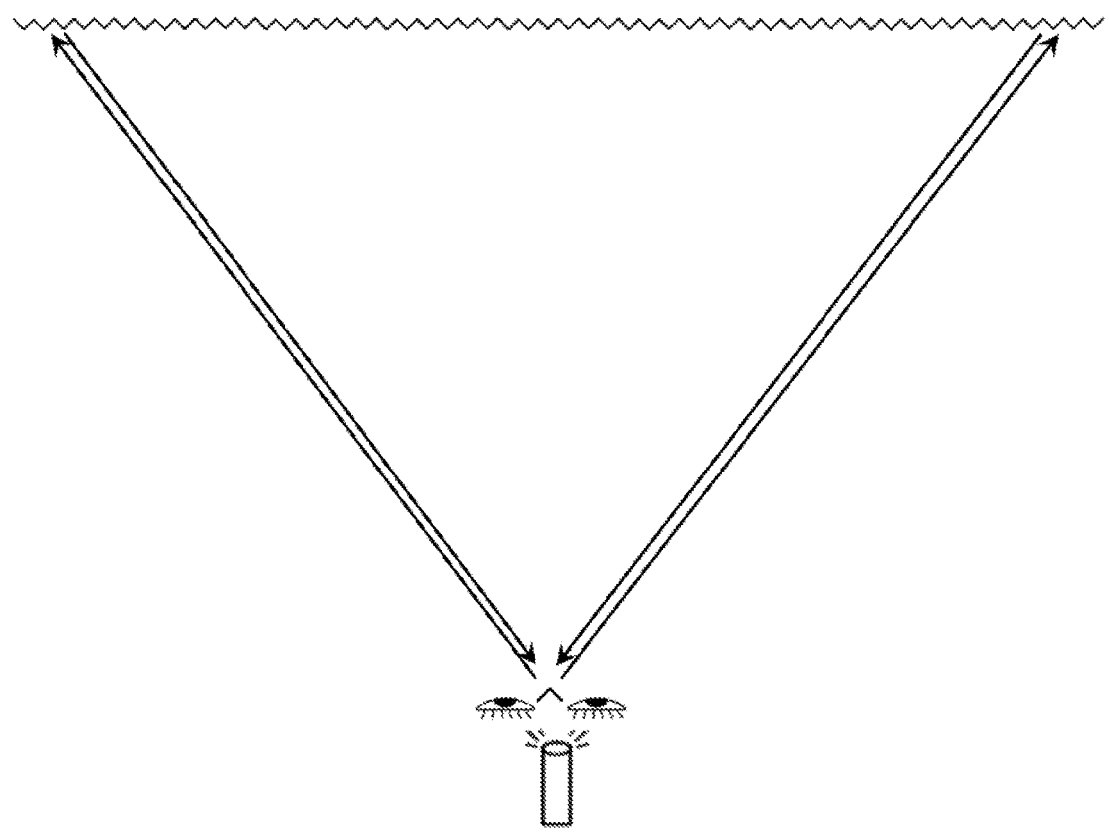
FIG. 2 schematically shows a top view of a system having a projector and a retro-reflective screen, in accordance with embodiments of the invention.

FIG. 2 shows a schematic top view of a system having a projector and a retro-reflective screen, in accordance with embodiments of the invention. The retro-reflective properties of the screen cause a majority of the light incident upon the screen to be reflected back towards the projector in a tight directional cone of light regardless of the incident angle. This is in contrast to some conventional screens which scatter incident light in a relatively isotropic manner. In such a conventional screen set up only a very small fraction of the light incident on the screen actually impinges upon the viewer's eyes. Because of the retro-reflective effect with the proposed system, if the viewer's eye is in close proximity to the projector such that the angle defined by the path from the projector to the reflective screen and returning to the viewer's eye is small, then the brightness of the image may be increased by as much as 100-500 times over a conventional projector and reflective screen set up. The system of FIG. 2 in some cases does not have a beam splitter.

Figure 3:
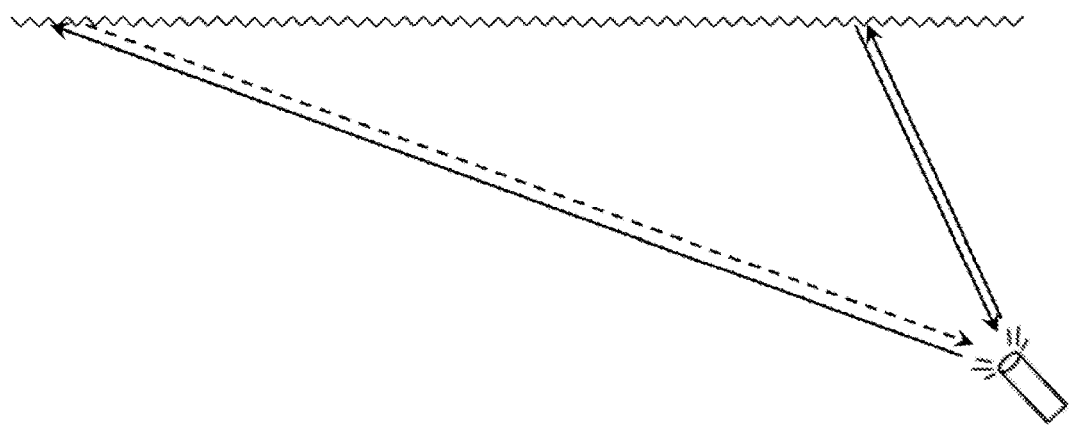
FIG. 3 schematically shows a top view of a representative retro-reflective screen and projector system with the viewer facing the screen at a non-normal angle without the principles of the invention.

FIG. 3 schematically shows a top view of a representative retro-reflective screen and projector system with the viewer facing the screen at a non-normal angle without the principles of the invention. In this figure it can be observed that the light incident on the screen at a location closer to the viewer has a more normal angle of incidence as compared to the light incident on the screen further from the viewer. While the properties of retro-reflective corner cubes are such that sensitivity to incident angled is reduced, in cases where the incident angle is significantly deviating from a normal angle, the brightness and uniformity can still be impacted.

Figure 4:
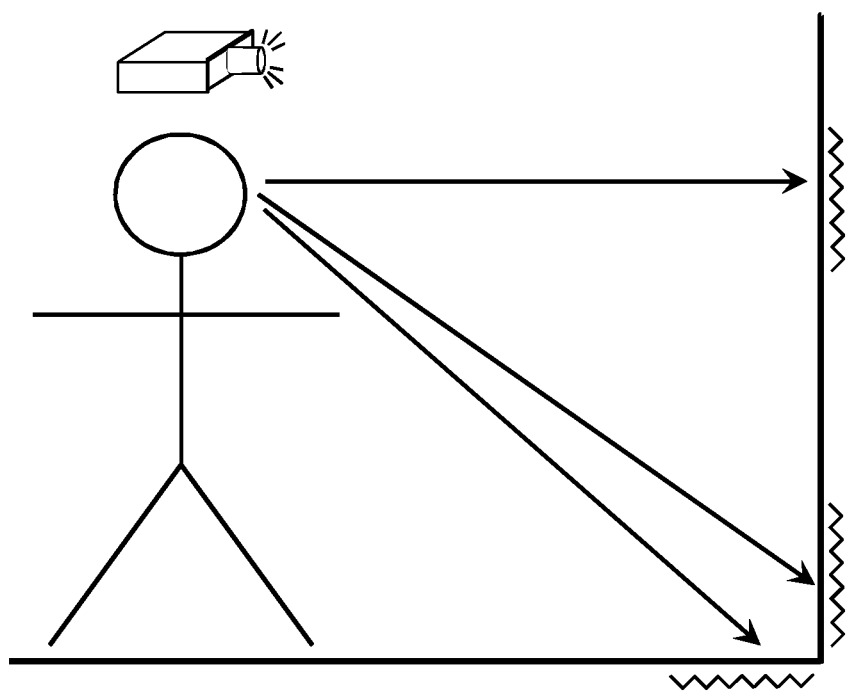
FIG. 4 schematically shows a side view of a representative retro-reflective screen and projector system without the principles of the invention and with the viewer at an intermediate distance from the front screen and bottom screen intersection.

FIG. 4 schematically shows a side view of a representative retro-reflective screen and projector system without the principles of the invention and with the viewer at an intermediate distance from the front screen and bottom screen intersection. In this figure, it can be seen that the projected light that contacts the screen directly in front of the viewer has a near normal incident angle relative to the nominal corner cube flat surface. In contrast, the light impinging on the retro-reflective screens near the intersection of the front wall and floor has incident angles that are consistently deviating from a normal incident angle. Additionally there is a consistent shift in the angle relative to normal that is different for the floor and the front wall screens. The light projected on the floor in this region consistently has an incident angle that is rotated counterclockwise to the normal direction as drawn in FIG. 4, while the light projected on the wall in this region consistently has an incident angle that is rotated clockwise relative to the normal direction as drawn in FIG. 4.

Figure 5:
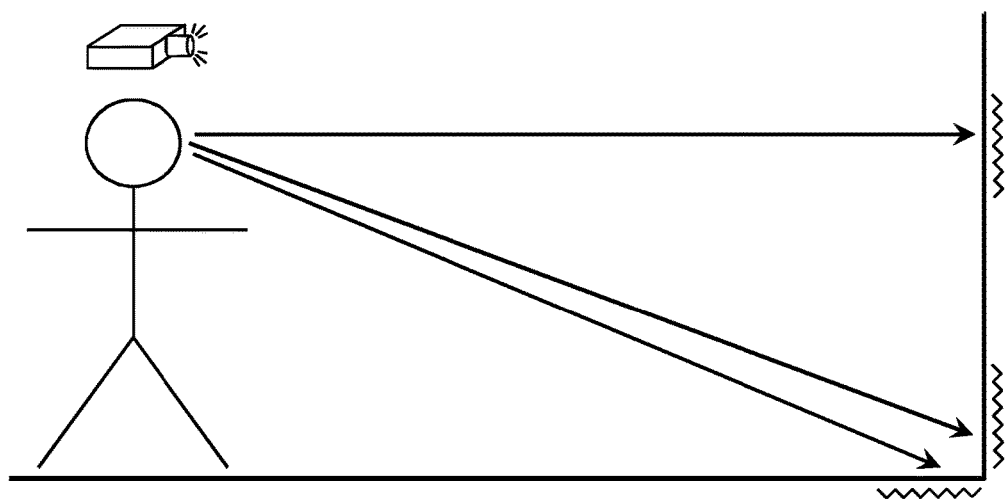
FIG. 5 schematically shows a side view of a representative retro-reflective screen and projector system without the principles of the invention and with the viewer at an larger than typical distance from the front screen and bottom screen intersection.

FIG. 5 schematically shows a side view of a representative retro-reflective screen and projector system without the principles of the invention and with the viewer at a further distance from the front screen and bottom screen intersection as compared to the scenario shown in FIG. 4. In this figure, it can be seen that the projected light that contacts the screen directly in front of the viewer has a near normal incident angle relative to the nominal corner cube flat surface. In contrast, the light impinging on the retro-reflective screens near the intersection of the front wall and floor has incident angles that are consistently deviating from a normal incident angle. The light projected on the floor in this region consistently has an incident angle that is rotated counterclockwise to the normal direction by a larger amount as compared to the scenario shown in FIG. 4, while the light projected on the wall in this region consistently has an incident angle that is rotated clockwise relative to the normal direction as drawn in FIG. 4 by a smaller amount as compared to the scenario shown in FIG. 4.

Figure 6:
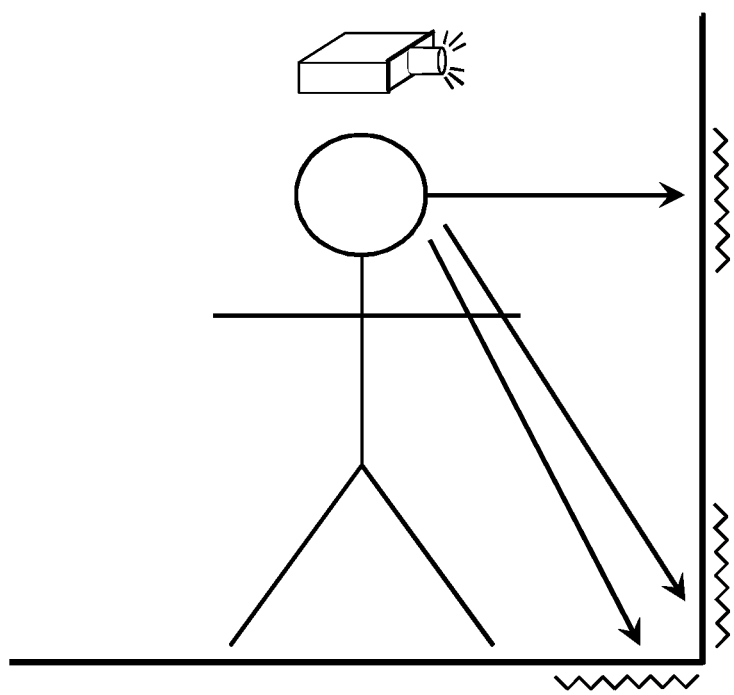
FIG. 6 schematically shows a side view of a representative retro-reflective screen and projector system without the principles of the invention and with the viewer at an smaller than typical distance from the front screen and bottom screen intersection.

FIG. 6 schematically shows a side view of a representative retro-reflective screen and projector system without the principles of the invention and with the viewer at a closer distance from the front screen and bottom screen intersection as compared to the scenario shown in FIG. 4. In this figure, it can be seen that the projected light that contacts the screen directly in front of the viewer has a near normal incident angle relative to the nominal corner cube flat surface. In contrast, the light impinging on the retro-reflective screens near the intersection of the front wall and floor has incident angles that are consistently deviating from a normal incident angle. The light projected on the floor in this region consistently has an incident angle that is rotated counterclockwise to the normal direction by a smaller amount as compared to the scenario shown in FIG. 4, while the light projected on the wall in this region consistently has an incident angle that is rotated clockwise relative to the normal direction as drawn in FIG. 4 by a larger amount as compared to the scenario shown in FIG. 4.

Figure 7:
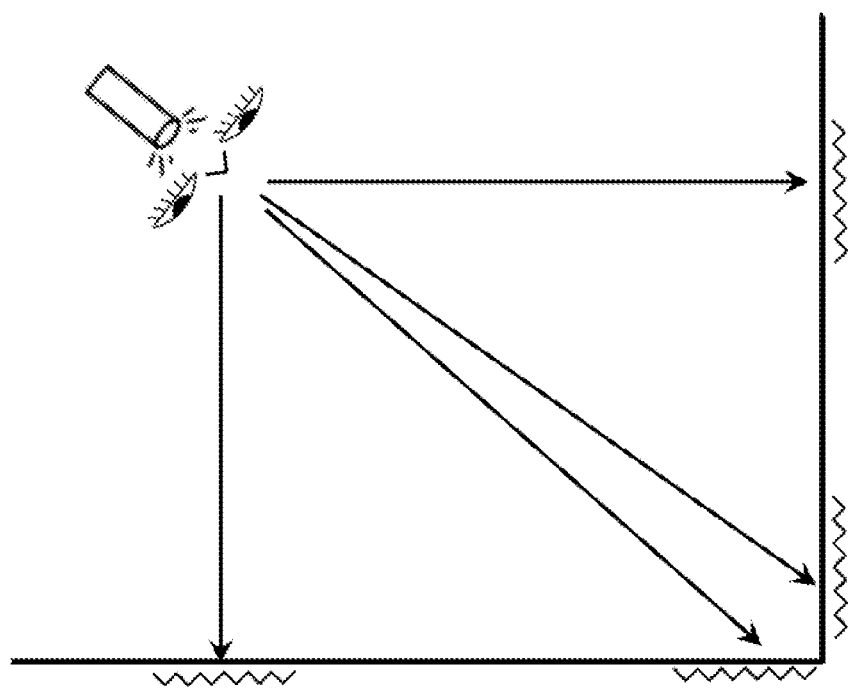
FIG. 7 schematically shows a top view of a representative retro-reflective screen and projector system without the principles of the invention and with the viewer facing the corner of a screen configuration.

FIG. 7 schematically shows a top view of a representative retro-reflective screen and projector system without the principles of the invention and with the viewer facing the corner of a screen configuration. and with the viewer at an intermediate distance from both the left screen and right screen, with left and right being defined as the screen to the left and right respectively of the viewer's direction of view in FIG. 7. In this figure, it can be seen that the projected light that contacts the screen directly in front of the viewer has a near normal incident angle relative to the nominal corner cube flat surface. In contrast, the light impinging on the retro-reflective screens near the intersection of the front wall and floor has incident angles that are consistently deviating from a normal incident angle. Additionally there is a consistent shift in the angle relative to normal that is different for the left and the right retro-reflective screens. The light projected on the right screen in this region consistently has an incident angle that is rotated counterclockwise to the normal direction as drawn in FIG. 7, while the light projected on the right screen in this region consistently has an incident angle that is rotated clockwise relative to the normal direction as drawn in FIG. 7.

Figure 8:
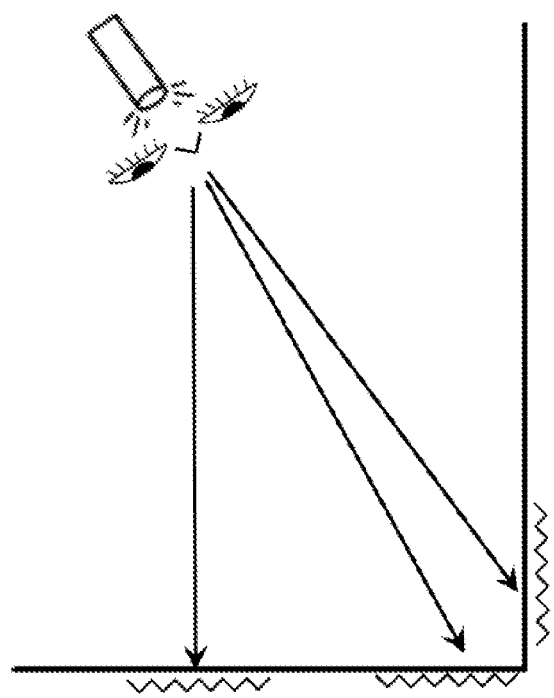
FIG. 8 schematically shows a top view of a representative retro-reflective screen and projector system without the principles of the invention and with the viewer facing the corner of a screen configuration from a position near one screen.

FIG. 8 schematically shows a top view of a representative retro-reflective screen and projector system without the principles of the invention and with the viewer facing the corner of a screen configuration from a position near one screen, and with the viewer at an close distance to the left screen and an intermediate distance to the right screen, with left and right being defined as the screen to the left and right respectively of the viewer's direction of view in FIG. 8. In this figure, it can be seen that the projected light that contacts the screen directly in front of the viewer has a near normal incident angle relative to the nominal corner cube flat surface. In contrast, the light impinging on the retro-reflective screens near the intersection of the left and right has incident angles that consistently deviating from a normal incident angle. Additionally there is a consistent shift in the angle relative to normal that is different for the left and the right retro-reflective screens. The light projected on the right screen in this region consistently has an incident angle that is rotated counterclockwise to the normal direction by a smaller amount than for the scenario shown in FIG. 7, while the light projected on the left screen in this region consistently has an incident angle that is rotated clockwise relative to the normal direction by a larger amount than for the scenario shown in FIG. 7.

Figure 9:
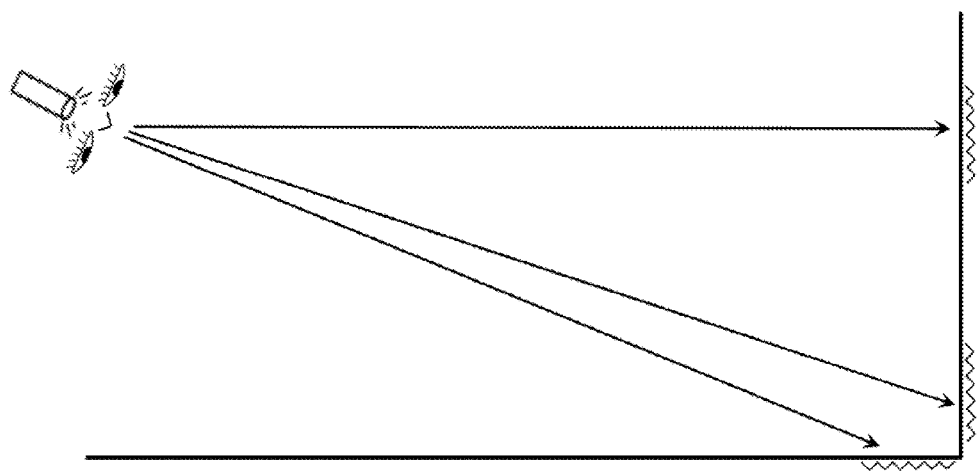
FIG. 9 schematically shows a top view of a representative retro-reflective screen and projector system without the principles of the invention and with the viewer facing the corner of a screen configuration from a position near one screen and relatively far from the intersection of the front and side screen.

FIG. 9 schematically shows a top view of a representative retro-reflective screen and projector system without the principles of the invention and with the viewer facing the corner of a screen configuration from a position near one screen, and with the viewer at an much further distance to the left screen and an intermediate distance to the right screen, with left and right being defined as the screen to the left and right respectively of the viewer's direction of view in FIG. 8. In this figure, it can be seen that the projected light that contacts the screen directly in front of the viewer has a near normal incident angle relative to the nominal corner cube flat surface. In contrast, the light impinging on the retro-reflective screens near the intersection of the left and right has incident angles that consistently deviating from a normal incident angle. Additionally there is a consistent shift in the angle relative to normal that is different for the left and the right retro-reflective screens. The light projected on the right screen in this region consistently has an incident angle that is rotated counterclockwise to the normal direction by a larger amount than for the scenario shown in FIG. 7, while the light projected on the left screen in this region consistently has an incident angle that is rotated clockwise relative to the normal direction by a smaller amount than for the scenario shown in FIG. 7.

Figure 10:
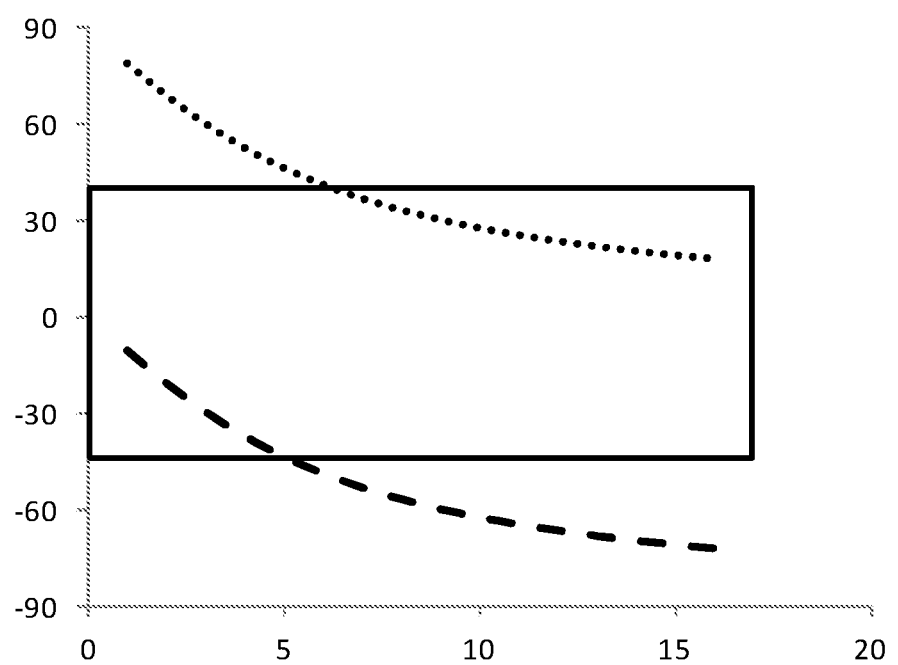
FIG. 10 shows a graph of the calculated incident angle relative to a normal incident angle for the location near the intersection of the front wall and floor as a function of the distance from the intersection, in accordance with embodiments of the invention.

FIG. 10 shows a graph of the calculated incident angle (vertical axis) relative to a normal incident angle for the location near the intersection of the front wall and floor as a function of the distance from the intersection in feet (horizontal axis). The dashed line represents the incident angle for the light projected onto the floor near the intersection while the dotted line represents the incident angle for the light projected onto the front wall retro-reflective screen near the intersection. A negative value represents an incident angle counter clockwise relative to a normal incident angle, while a positive value represents an incident angle counter clockwise relative to a normal incident angle. The drawn rectangle represents schematically the most desired or optimal incident angle range. It can be seen that at large distances from the front wall, the incident angle for light projected onto the floor retro-reflective screen falls outside of the desired range, while at small distances from the front wall, the incident angle for light projected onto the front wall retro-reflective screen falls outside of the desired range.

Figure 11:
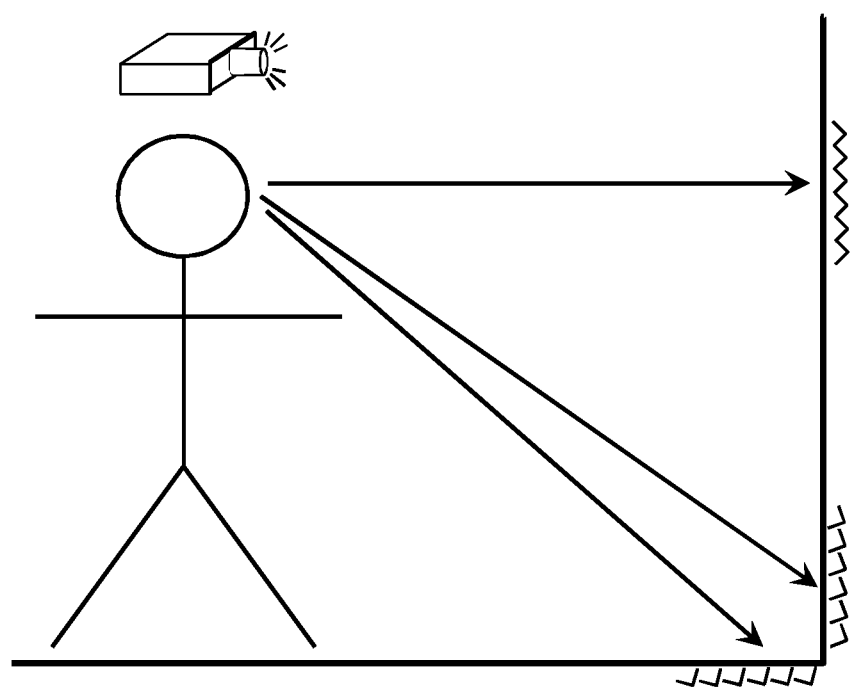
FIG. 11 schematically shows a side view of a representative retro-reflective screen and projector system of the invention and with the viewer at an intermediate distance from the front screen and bottom screen intersection and with clusters of screen elements optimized, in accordance with embodiments of the invention.

FIG. 11 schematically shows a side view of a representative retro-reflective screen and projector system of the invention and with the viewer at an intermediate distance from the front screen and bottom screen intersection and with clusters of screen elements optimized in accordance with an embodiment of the invention. By leveraging the patterns observed in the prior figures which showed a consistent direction of deviation from a normal incident angle that is in opposite direction for the retro-reflective screen on the floor in this region as compared to the retro-reflective screen on the wall in this region, it is possible to engineer the orientation of individual corner cube elements or clusters of corner cube elements. In FIG. 11, the corner cube elements are drawn as individually rotated to compensate for the systematic off-normal incident light in these respective regions.

Figure 12:
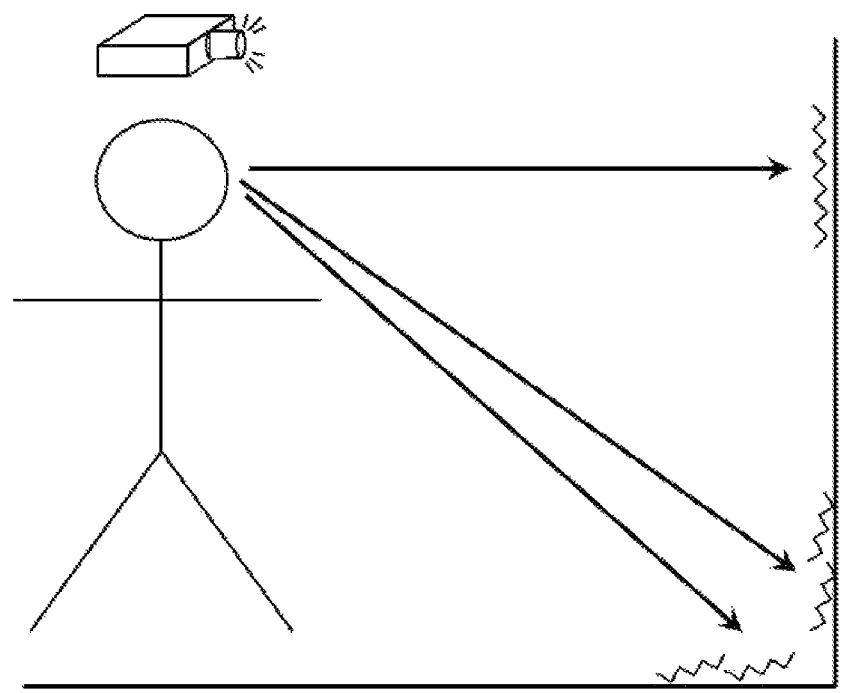
FIG. 12 schematically shows a side view of a representative retro-reflective screen and projector system of the invention and with the viewer at an intermediate distance from the front screen and bottom screen intersection and with individual screen elements optimized, in accordance with embodiments of the invention.

FIG. 12 schematically shows a side view of a representative retro-reflective screen and projector system of the invention and with the viewer at an intermediate distance from the front screen and bottom screen intersection and with clusters of screen elements optimized in accordance with an embodiment of the invention. By leveraging the patterns observed in the prior figures which showed a consistent direction of deviation from a normal incident angle that is in opposite direction for the retro-reflective screen on the floor in this region as compared to the retro-reflective screen on the wall in this region, it is possible to engineer the orientation of individual corner cube elements or clusters of corner cube elements. In FIG. 11, the corner cube elements are drawn as clusters of rotated corner cube elements to compensate for the systematic off-normal incident light in these respective regions.

Figure 13:
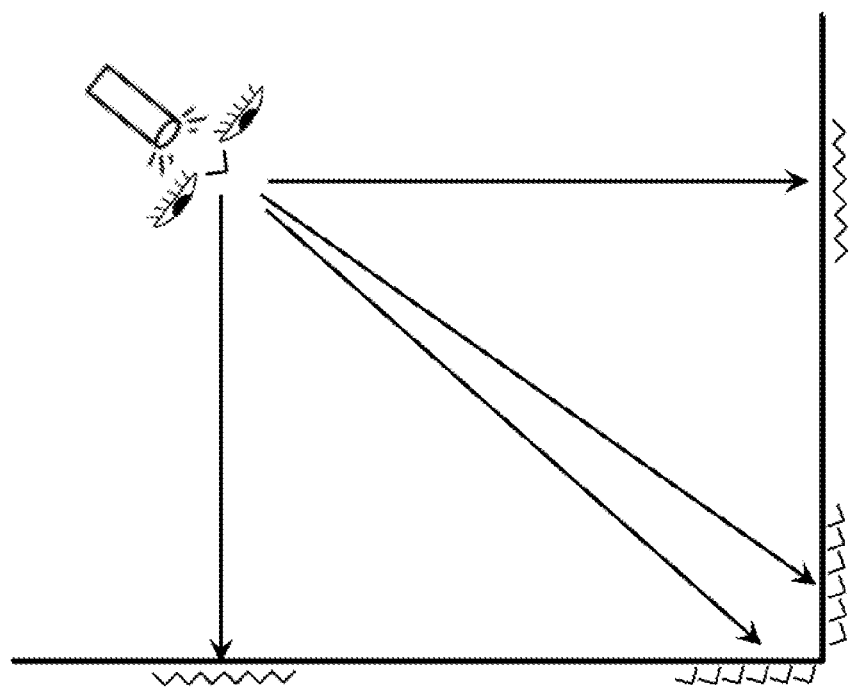
FIG. 13 schematically shows a top view of a representative retro-reflective screen and projector system with the viewer facing the corner of a screen configuration and with clusters of screen elements optimized, in accordance with embodiments of the invention.

FIG. 13 schematically shows a top view of a representative retro-reflective screen and projector system of the invention and with the viewer at an intermediate distance from the left and right screen intersection and with clusters of screen elements optimized in accordance with an embodiment of the invention. By leveraging the patterns observed in the prior figures which showed a consistent direction of deviation from a normal incident angle that is in opposite direction for the retro-reflective screen on the left wall in this region as compared to the retro-reflective screen on the right wall in this region, it is possible to engineer the orientation of individual corner cube elements or clusters of corner cube elements. In FIG. 13, the corner cube elements are drawn as individually rotated to compensate for the systematic off-normal incident light in these respective regions.

Figure 14:
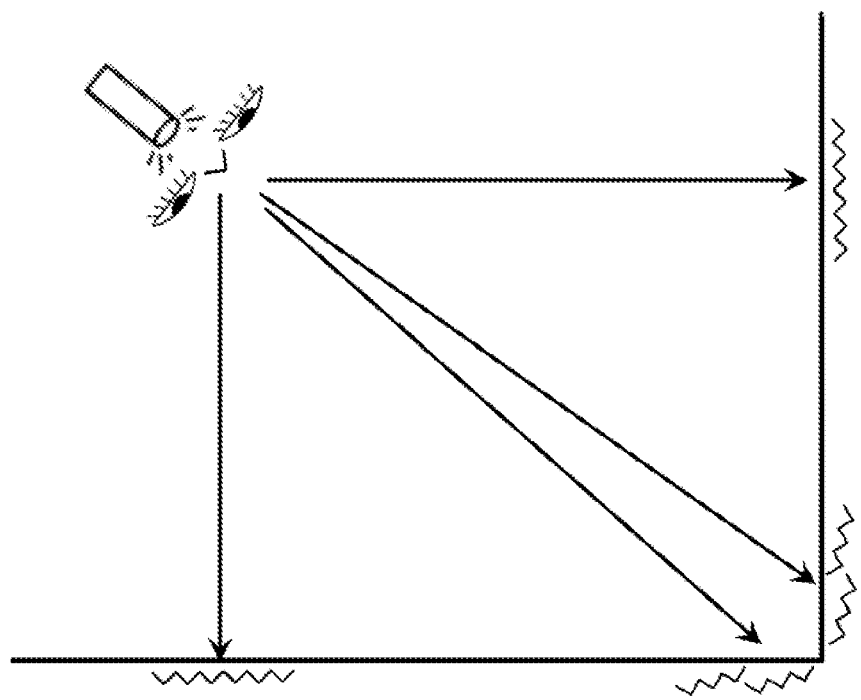
FIG. 14 schematically shows a top view of a representative retro-reflective screen and projector system with the viewer facing the corner of a screen configuration and with individual screen elements optimized, in accordance with embodiments of the invention.

FIG. 14 schematically shows a top view of a representative retro-reflective screen and projector system of the invention and with the viewer at an intermediate distance from the left and right screen intersection and with clusters of screen elements optimized in accordance with an embodiment of the invention. By leveraging the patterns observed in the prior figures which showed a consistent direction of deviation from a normal incident angle that is in opposite direction for the retro-reflective screen on the left wall in this region as compared to the retro-reflective screen on the right wall in this region, it is possible to engineer the orientation of individual corner cube elements or clusters of corner cube elements. In FIG. 14, the corner cube elements are drawn as clusters of rotated corner cube elements to compensate for the systematic off-normal incident light in these respective regions.

Figure 19:
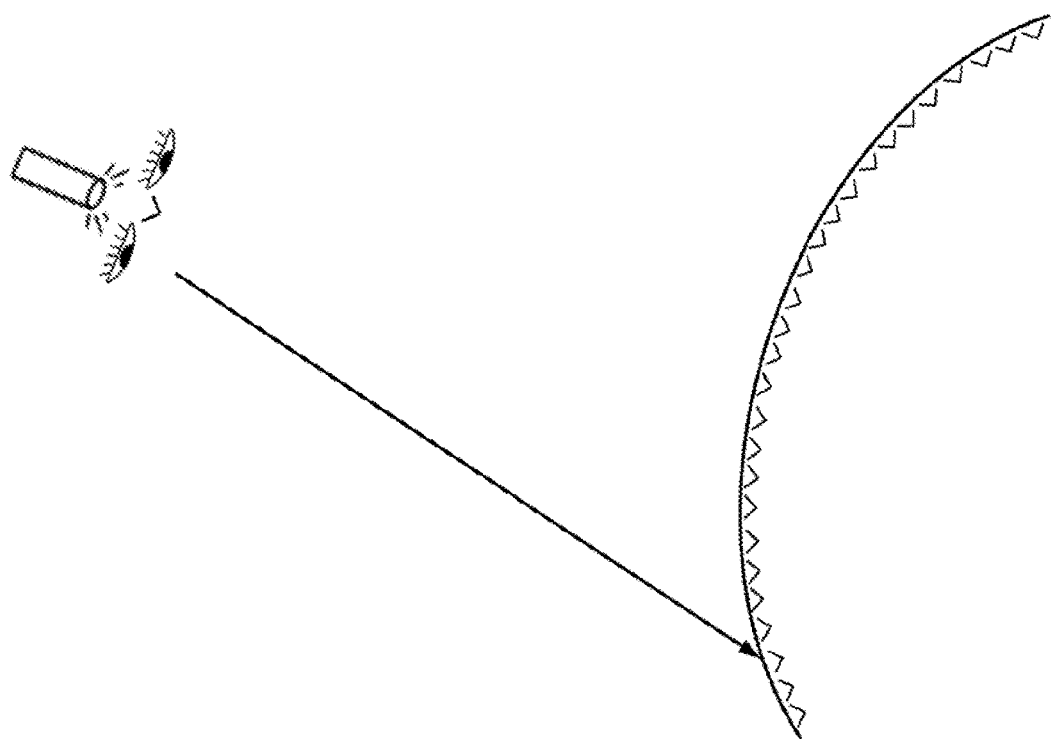
FIG. 19 schematically shows a top view of a representative retro-reflective screen and projector system without the principles of the invention and with the viewer and projector facing a curved screen.
Figure 20:
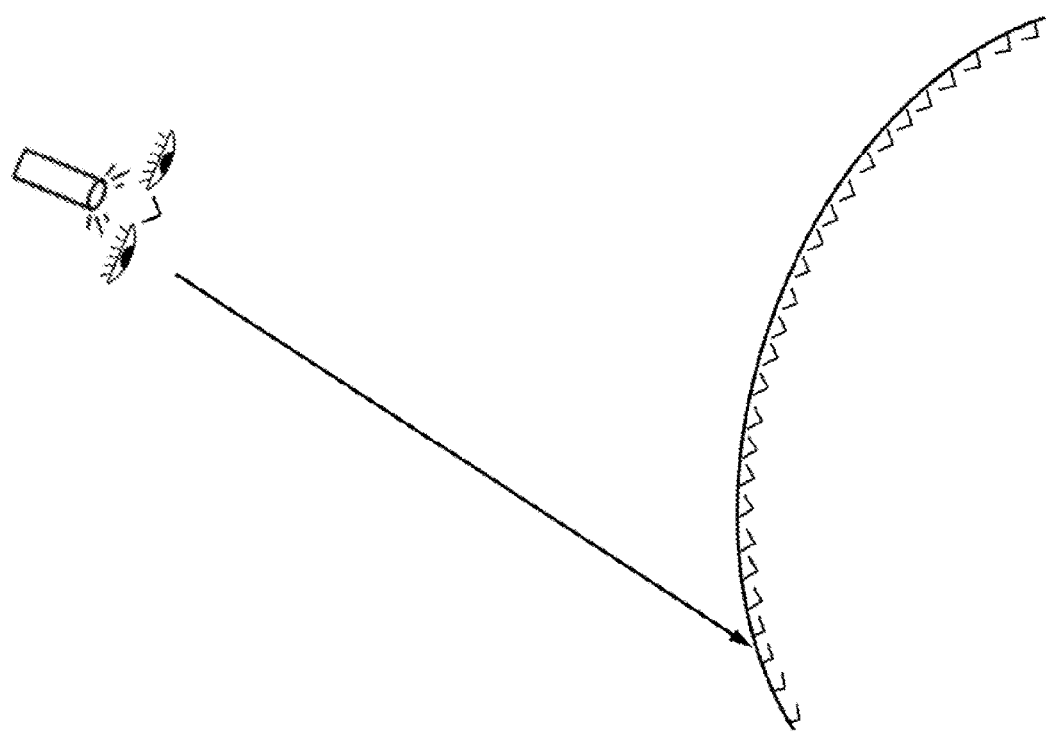
FIG. 20 schematically shows a top view of a representative retro-reflective screen and projector system with the viewer and projector facing a curved screen and with individual screen elements optimized in accordance with embodiments of the invention.

The examples and Figures described above used flat screen surfaces as examples for easier explanation and visualization. However, the principles described above apply to curve screens and surfaces as well. When it is known in advance that certain areas of a screen have certain typical incident angles to the screen surface, then embodiments of the invention may be used to engineer the orientation of the retroreflective elements such that the incident angles to the elements are small (e.g., 45 degrees or less) even when the incident angles to the macroscopic screen surface may not be small (e.g., more than 45 degrees). For example, FIG. 19 schematically shows a top view of a representative retro-reflective screen and projector system without the principles of the invention and with the viewer and projector facing a curved screen. In this Figure we see that for certain areas of the screen, the incident angle for the screen will be greater than 45 degrees and the corresponding incident angle for the retroreflective element at that location will also be greater than 45 degrees. FIG. 20 schematically shows a top view of a representative retro-reflective screen and projector system with the viewer and projector facing a curved screen and with individual screen elements optimized in accordance with embodiments of the invention. In this case, we see that even through the incident angle for the screen will be greater than 45 degrees, the corresponding incident angle for the retroreflective element at that location can be significantly less than 45 degrees.

Figure 15:
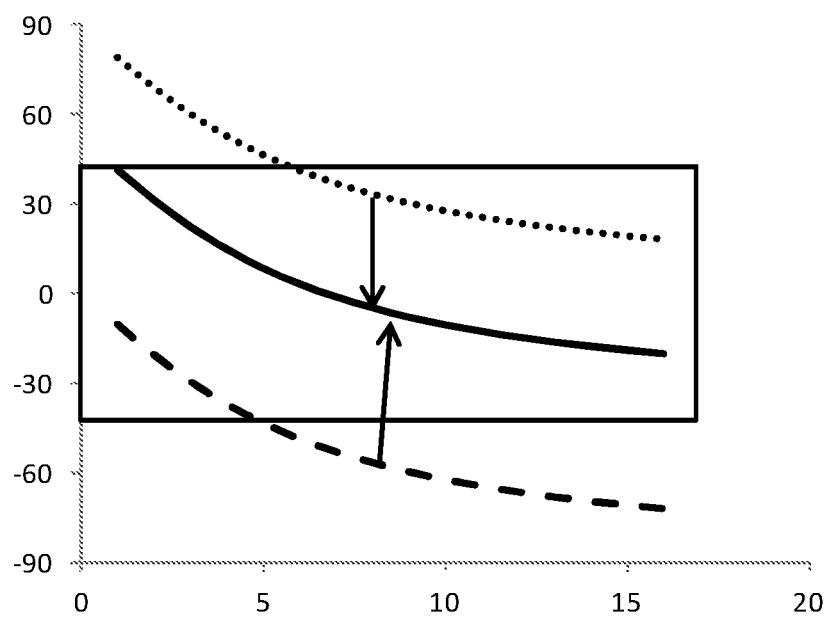
FIG. 15 shows a graph of the calculated incident angle relative to a normal incident angle for the location near the intersection of the front wall and floor as a function of the distance from the intersection with corner cube orientation optimized, in accordance with embodiments of the invention.

FIG. 15 shows a graph of the calculated incident angle (vertical axis) relative to a normal incident angle for the location near the intersection of the front wall and floor as a function of the distance from the intersection in feet (horizontal axis) with corner cube orientation optimized in accordance with an embodiment of the invention. The dashed line represents the incident angle for the light projected onto the floor near the intersection while the dotted line represents the incident angle for the light projected onto the front wall retro-reflective screen near the intersection. Both of these lines represent a scenario lacking corner cube orientation optimized in accordance with an embodiment of the invention. A negative value represents an incident angle counter clockwise relative to a normal incident angle, while a positive value represents an incident angle counter clockwise relative to a normal incident angle. The drawn rectangle represents schematically the most desired or optimal incident angle range. The solid curve in the chart represents the incident angle for both the light projected onto the floor near the intersection as well as the light projected onto the front wall retro-reflective screen near the intersection under the condition that the corner cube orientation has been optimized in accordance with an embodiment of the invention. For both surfaces, the incident angle for the light projected onto the respective surface remains within the rectangle representing schematically the most desired or optimal incident angle range.

Figure 16:
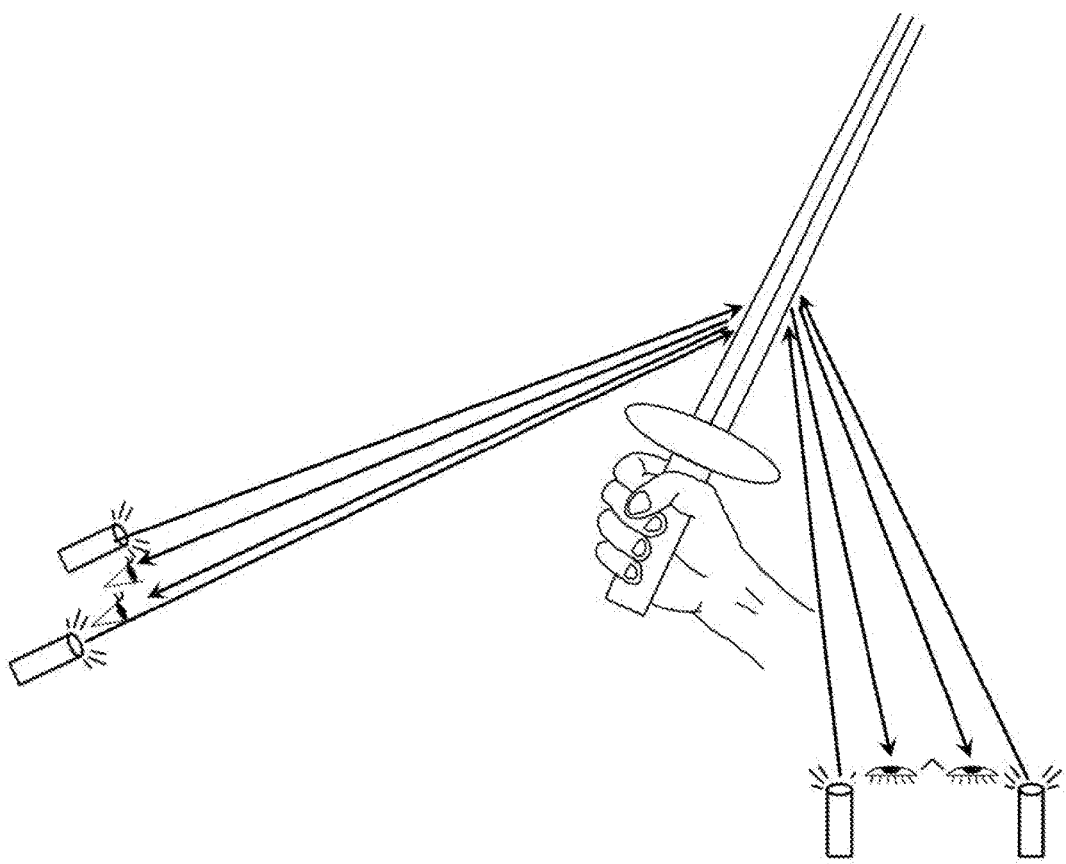
FIG. 16 schematically shows an implement with a retro-reflective surface and typical incidence angles for such an implement, in accordance with embodiments of the invention.

FIG. 16 schematically shows an implement with a retro-reflective surface and typical incidence angles for such an implement. In this figure the implement is a sword. In general, for any user or game player wielding an implement, the incident angle will be less than 90 degrees in the direction closer to the user. Another way to think of this is that a user will not be viewing a sword or other implement that he or she is holding from the vantage point of the tip of the implement. Because of this systematic offset from the normal direction for the incident angle, the retro-reflective elements can be oriented in a manner similar to the examples given above in order to optimize uniformity and brightness.

Systems and methods of this disclosure provide for engineering and customizing the retro-reflective elements of the retro-reflective screen such that the incident angle to the corner cube reflective element have a distribution centered upon the normal incident angle. In this manner the brightness and uniformity of projected images can be significantly improved.

Computer Systems

Another aspect of the present disclosure provides a system that is programmed or otherwise configured to implement the methods of the disclosure. The system can include a computer server that is operatively coupled to a projector and a photo detector. The projector and photo detector can be standalone units, or integrated as a projection and detection system.

Figure 18:
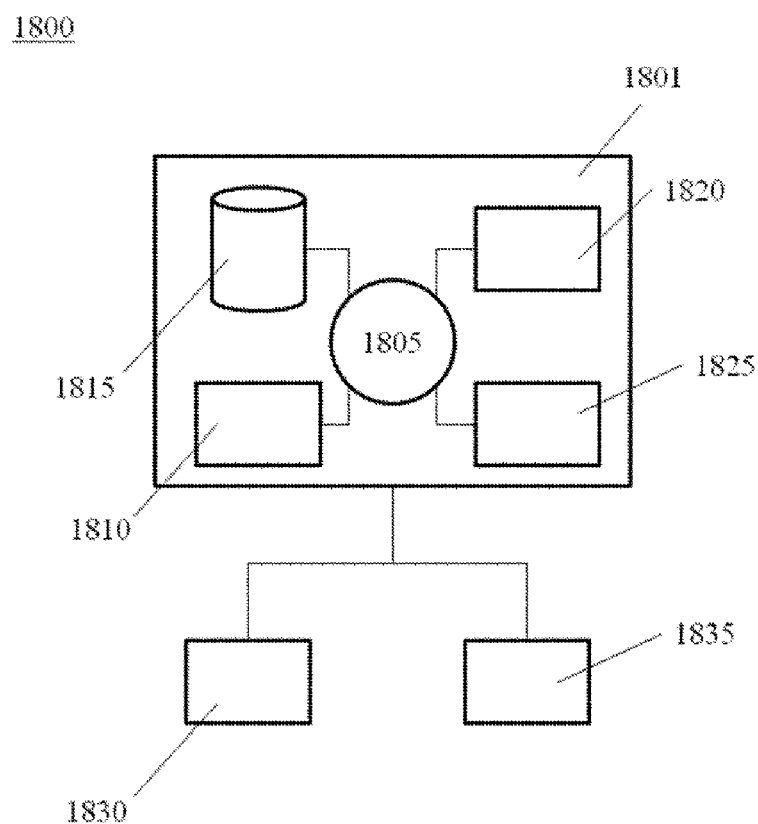
FIG. 18 schematically illustrates a computer system programmed or otherwise configured to facilitate methods of the present disclosure.

FIG. 18 shows a system 1800 comprising a computer server ("server") 1801 that is programmed to implement methods disclosed herein. The server 1801 includes a central processing unit (CPU, also "processor" and "computer processor" herein) 1805, which can be a single core or multi core processor, or a plurality of processors for parallel processing. The server 1801 also includes memory 1810 (e.g., random-access memory, read-only memory, flash memory), electronic storage unit 1815 (e.g., hard disk), communication interface 1820 (e.g., network adapter) for communicating with one or more other systems, and peripheral devices 1825, such as cache, other memory, data storage and/or electronic display adapters. The memory 1810, storage unit 1815, interface 1820 and peripheral devices 1825 are in communication with the CPU 1805 through a communication bus (solid lines), such as a motherboard. The storage unit 1815 can be a data storage unit (or data repository) for storing data. The server 1801 can be operatively coupled to a computer network ("network") with the aid of the communication interface 1820. The network can be the Internet, an internet and/or extranet, or an intranet and/or extranet that is in communication with the Internet. The network in some cases is a telecommunication and/or data network. The network can include one or more computer servers, which can enable distributed computing, such as cloud computing. The network, in some cases with the aid of the server 1801, can implement a peer-to-peer network, which may enable devices coupled to the server 1801 to behave as a client or a server.

The storage unit 1815 can store files or data. The server 1801 can include one or more additional data storage units that are external to the server 1801, such as located on a remote server that is in communication with the server 1801 through an intranet or the Internet.

In some situations, the system 1800 includes a single server 1801. In other situations, the system 1800 includes multiple servers in communication with one another through an intranet and/or the Internet.

The server 1801 can be adapted to store user information and data of or related to a projection environment, such as, for example, display angles and intensity settings. The server 1801 can be programmed to display an image or video through a projector coupled to the server 1801.

Methods as described herein can be implemented by way of machine (or computer processor) executable code (or software) stored on an electronic storage location of the server 1801, such as, for example, on the memory 1810 or electronic storage unit 1815. During use, the code can be executed by the processor 1805. In some cases, the code can be retrieved from the storage unit 1815 and stored on the memory 1810 for ready access by the processor 1805. In some situations, the electronic storage unit 1815 can be precluded, and machine-executable instructions are stored on memory 1810.

The code can be pre-compiled and configured for use with a machine have a processor adapted to execute the code, or can be compiled during runtime. The code can be supplied in a programming language that can be selected to enable the code to execute in a pre-compiled or as-compiled fashion.

The server 1801 is coupled to (e.g., in communication with) a projector 1830 and a photo detector 1835. In an example, the projector 1830 can project an image or video onto a retro-reflective screen. In another example, the project 1830 can project ultraviolet or infrared light onto the retro-reflective screen. The photo detector 1835 can detect (or measure) reflected light from the retro-reflective screen.

The projector 1830 can include one or more optics for directing and/or focusing an image or video onto the retro-reflective screen. The photo detector can be a device that is configured to generate an electrical current upon exposure to light, such as, for example, a charge-coupled device (CCD).

Aspects of the systems and methods provided herein, such as the server 1801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Methods and systems of the present disclosure can be implemented by way of one or more algorithms. An algorithm can be implemented by way of software upon execution by the central processing unit 1805. The algorithm can, for example, determine optimum locations and/or orientations for retro-reflective screen elements.

Systems and methods provided herein may be combined with or modified by other systems and methods, such as those described in, for example, PCT Application Serial Nos. PCT/US13/45716 and PCT/US2015/032757; U.S. Patent Publication No. 2013/0342813; U.S. Pat. Nos. 3,817,596, 4,775,219, 5,763,049, 7,261,424, and 7,370,981; and P. R. Yoder, "Study of Light Deviation Errors in Triple Mirrors and Tetrahedral Prisms," J. Optical Soc. Amer., vol. 48, No. 7, pp 496-499 (July 1958), each of which is entirely incorporated herein by reference, each of which is entirely incorporated herein by reference.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A display system, comprising:
   a retro-reflective screen covered with a screen material, the retro-reflective screen having a plurality of retro-reflective screen elements positioned within the screen material, wherein at least one of the plurality of retro-reflective screen elements is oriented so as to have an incident angle that is less than 45 degrees, and wherein a portion of the screen material that corresponds to the at least one screen element has an incident angle that is greater than the incident angle of the at least one screen element; and
   at least one projector that (i) generates light characterizing an image or video and (ii) projects the light onto the retro-reflective screen,
   wherein screen elements having an incident angle above a certain threshold are re-oriented.

2. The display system of claim 1, wherein the at least one screen element has an incident angle that is between 0 degrees and 75 degrees, and wherein the portion of the screen material that corresponds to the at least one screen element has an incident angle of 90 degrees.

3. The display system of claim 1, wherein the at least one screen element has an incident angle that is between 0 degrees and 60 degrees, and wherein the portion of the screen material that corresponds to the at least one screen element has an incident angle of 75 degrees.

4. The display system of claim 1, wherein the at least one screen element has an incident angle that is between 0 degrees and 55 degrees, and wherein the portion of the screen material that corresponds to the at least one screen element has an incident angle of 60 degrees.

5. The display system of claim 1, wherein the at least one screen element has an incident angle that is between 0 degrees and 40 degrees, and wherein the portion of the screen material that corresponds to the at least one screen element has an incident angle of 45 degrees.

6. The display system of claim 1, wherein the at least one screen element has an incident angle that is between 0 degrees and 20 degrees, and wherein the portion of the screen material that corresponds to the at least one screen element has an incident angle of 30 degrees.

7. The display system of claim 1, wherein the projector projects the light onto the retro-reflective screen without passage through a beam splitter.

8. The display system of claim 1, wherein the retro-reflective screen reflects the light from the projector to a viewer without the passage of light through a beam splitter.

9. The display system of claim 1, wherein the retro-reflective screen reflects the light from the projector to a viewer at an observation angle that is less than about 3°.

10. The display system of claim 1, wherein the projector is mountable on a body of a viewer.

11. The display system of claim 10, wherein the projector is mountable on a head of a viewer.

12. The display system of claim 1, wherein the retro-reflective screen comprises truncated corner cube reflectors.

13. The display system of claim 1, further comprising a sound system for providing sound to complement the image or video.

14. The display system of claim 1, wherein the image or video is three-dimensional.

15. The display system of claim 1, wherein a portion of the plurality of retro-reflective screen elements are oriented incrementally to optimize for a certain position of a projector relative to the screen.

16. The display system of claim 1, wherein a portion of the plurality of retro-reflective screen elements are oriented incrementally to optimize for a certain position of a user relative to the screen.

17. The display system of claim 1, wherein screen elements that do not have an incident angle above a certain threshold are not re-oriented.

18. The display system of claim 1, wherein a portion of the plurality of retro-reflective screen elements are oriented towards a certain position of a user and/or projector relative to the screen.

19. The display system of claim 18, wherein a portion of the plurality of retro-reflective screen elements are oriented towards an expected position of the user and/or projector relative to the screen.

20. The display system of claim 18, wherein a portion of the plurality of retro-reflective screen elements are oriented towards a position nearby an expected position of the user and/or projector relative to the screen.

21. The display system of claim 1, wherein at least a portion of the screen elements are oriented in clusters.

22. The display system of claim 1, wherein at least a portion of the screen elements is oriented in continuous manner.

23. The display system of claim 1, wherein at least a portion of the plurality of screen elements is provided on an implement or gaming accessory or other screen-related object oriented so as to optimize incident angles of the plurality of screen elements.

24. A display system, comprising:
a retro-reflective screen covered with a screen material, the retro-reflective screen having a plurality of retro-reflective screen elements positioned within the screen material, wherein at least one of the plurality of retro-reflective screen elements is oriented so as to have an incident angle that is less than 45 degrees, and wherein a portion of the screen material that corresponds to the at least one screen element has an incident angle that is greater than the incident angle of the at least one screen element; and
at least one projector that (i) generates light characterizing an image or video and (ii) projects the light onto the retro-reflective screen,
wherein a portion of the plurality of retro-reflective screen elements are oriented incrementally to optimize for a certain position of a projector relative to the screen.

25. A display system, comprising:
a retro-reflective screen covered with a screen material, the retro-reflective screen having a plurality of retro-reflective screen elements positioned within the screen material, wherein at least one of the plurality of retro-reflective screen elements is oriented so as to have an incident angle that is less than 45 degrees, and wherein a portion of the screen material that corresponds to the at least one screen element has an incident angle that is greater than the incident angle of the at least one screen element; and
at least one projector that (i) generates light characterizing an image or video and (ii) projects the light onto the retro-reflective screen,
wherein a portion of the plurality of retro-reflective screen elements are oriented incrementally to optimize for a certain position of a user relative to the screen.

* * * * *